(12) United States Patent
Noble, Jr.

(10) Patent No.: US 8,538,006 B1
(45) Date of Patent: Sep. 17, 2013

(54) SYSTEMS, METHODS, AND COMPUTER PROGRAM PRODUCTS FOR PROVIDING INTERACTIVE INTERFACES TO CALL CENTER AGENTS

(75) Inventor: James K. Noble, Jr., Marietta, GA (US)

(73) Assignee: Noble Systems Corporation, Atlanta, GA (US)

(*) Notice: Subject to any disclaimer, the term of this patent is extended or adjusted under 35 U.S.C. 154(b) by 0 days.

(21) Appl. No.: 13/459,524

(22) Filed: Apr. 30, 2012

(51) Int. Cl.
*H04M 3/00* (2006.01)
*G06Q 10/00* (2012.01)
*G06Q 30/00* (2012.01)

(52) U.S. Cl.
USPC .................. 379/265.06; 705/7.15; 705/14.42

(58) Field of Classification Search
USPC ............... 379/265, 266; 370/352, 353, 354, 370/355, 356, 357
See application file for complete search history.

(56) References Cited

U.S. PATENT DOCUMENTS

| | | | |
|---|---|---|---|
| 5,239,460 A | 8/1993 | LaRoche | |
| 5,483,444 A | 1/1996 | Heintzeman et al. | |
| 6,044,355 A * | 3/2000 | Crockett et al. | 705/7.39 |
| 6,049,779 A * | 4/2000 | Berkson | 705/14.39 |
| 6,512,415 B1 * | 1/2003 | Katz | 379/88.22 |
| 7,916,858 B1 * | 3/2011 | Heller et al. | 379/265.12 |
| 2004/0210475 A1 * | 10/2004 | Starnes et al. | 705/11 |
| 2006/0182258 A1 * | 8/2006 | Sisselman et al. | 379/265.02 |
| 2007/0172050 A1 * | 7/2007 | Weinstein et al. | 379/266.07 |

OTHER PUBLICATIONS

"Agent Motivation Is Not All About Incentive Schemes," http://www.callcentrehelper.com/agent-motivation-is-not-all-about-incentive-schemes-27447.htm, Feb. 22, 2012.
Carlson, Lauren, Gamification: The Key to Preventing Support Agent Burnout, http://blog.softwareadvice.com/articles/crm/gamification-preventing-support-agent-burnout-1022112/, Feb. 21, 2012.
Hammarberg, Christina, "Gamified Helpdesk Concepts May Combat Agent Burnout," International Customer Management Institute, Mar. 1, 2012.
Noble Systems Corporation, Noble Composer 9 User Manual, Feb. 2, 2010, 428 pages, Atlanta, GA.

* cited by examiner

*Primary Examiner* — Mohammad Islam
*Assistant Examiner* — Kharye Pope

(57) ABSTRACT

Embodiments of the present invention provide computer program products, methods, and systems for providing an interactive interface to a particular agent of a plurality of call center agents. In various embodiments, display criteria for providing the interface are defined that relate to a performance parameter associated with the plurality of call center agents. Further, in various embodiments, interaction criteria for providing an opportunity to interact with the interface are defined that relate to a second performance parameter associated with the plurality of call center agents. Thus, in particular embodiments, the interactive interface is provided to the particular agent as a result of the agent having a measurement of the performance parameter meet the display criteria and/or a measurement of the second performance parameter meet the interaction criteria. Once the interactive interface has been provided, the agent may be awarded with an award based on the agent's interaction with the interface.

17 Claims, 10 Drawing Sheets

Nice Job on that Call!!!!   [EXIT]

Lets Play Trivia!

Please Select the Correct
Answer Below and Select Enter.

In Handling a Callback, You Should Always...

○ Immediately Terminate the Call If No One Answers After 3 Rings.

✓ ○ When Answered, Introduce Yourself and Provide the Reason for Calling.

✗ ● When Answered, Immediately Request Identification from Party.

[ENTER]      810

Sorry that is Incorrect, the Correct Answer is Checked

FIG. 8

SYSTEMS, METHODS, AND COMPUTER PROGRAM PRODUCTS FOR PROVIDING INTERACTIVE INTERFACES TO CALL CENTER AGENTS

BACKGROUND

A call center is typically thought of a department used for the purpose of receiving and transmitting a large volume of communications, such as telephone calls. For instance, many companies will provide call centers so that customers may contact the centers in order to receive support for products sold by the companies. Oftentimes, a call center involves the use of a plurality of agents who handle the communications. However, a major problem encountered in many call centers is agents become "burned out." That is, many times, agents become to feel as though they have nothing left or any energy left to give to their jobs or to the company they work for. Such feelings often lead to high turnover rates for agents. Experts have pointed out contributing factors that lead to agent burn-out include lack of motivation and becoming uninterested in performing the same tasks day-after-day.

To combat such factors, some employers have added elements to an agent's workday to engage the agent in his daily tasks and to, hopefully, boost agent retention. For instance, one technique employed to add such elements to an agent's workday is to incorporate gaming techniques into non-gaming applications to encourage participation. For example, a counter may be incorporated into an agent's work screen that keeps track of the number of calls the agent brings to a resolution. The screen may also display the particular agent's record for a day and/or the overall record for a day for all agents. As a result, the counter gives the agent a goal to strive for during the day, keeps the agent engaged in his daily activities, and promotes desired behavior.

However, a problem often encountered in providing elements into an agent's work screen, like the counter described above, is that such elements typically only keep the agent engaged for a limited period of time before the agent becomes disinterested in the elements. That is, many times, such elements are considered simple and repetitive, and do not require any direct interaction with the agent. In addition, with respect to the counter example described above, the agent is likely to set a record that becomes too hard to challenge on a daily basis and thus, the agent feels like beating his record is highly unlikely and, again, the agent becomes disinterested.

Thus, a need in the art exists for a process in which a variety of such elements may be developed, installed, scheduled, managed, and reported for agents' everyday work activities. Further, a need in the art exists for implementing elements that involve direct interaction with agents. Furthermore, a need in the art exists for a process that provides a variety of incentives that may be tied to these elements to further motivate agents. It is with respect to these considerations and others that the disclosure herein is presented.

BRIEF SUMMARY

In general, embodiments of the present invention provide computer program products, methods, systems, apparatus, and computing entities for providing an interactive interface to a particular agent from a plurality of call center agents of a call center. In various embodiments, display criteria for providing the interactive interface on any one of a plurality of computer workstations used by the plurality of call center agents are defined and/or recorded. In particular embodiments, the display criteria may be related to a display performance parameter associated with the call center agents. In addition, in various embodiments, interaction criteria for providing an opportunity to interact with the interactive interface to win an award are defined and/or recorded. Similar to the display criteria, in particular embodiments, the interaction criteria may be related to an interaction performance parameter associated with the plurality of call center agents.

Depending on the embodiment, the process for providing the interactive interface to the particular agent may involve scheduling a time period for making the interactive interface available to the plurality of call center agents. Further, the process may involve providing the interactive interface on a computer workstation used by the particular agent, awarding the agent with the award based on the agent's interaction with the interactive interface, and tracking and reporting the awarding of the award to the agent. In particular embodiments, one or more steps of the process may be performed as a result of a measurement of the display performance parameter for the particular agent meeting the display criteria and/or a measurement of the interaction performance parameter for the particular agent meeting the interaction criteria during the time period.

In particular embodiments, the interactive interface may include a game and the agent's interaction involves playing the game. For instance, the game may be one of a roulette wheel, a slot machine, dice, or cards. Further, in particular embodiments, the process may involve defining agent criteria for identifying the plurality of call center agents that may interact with the interface.

In various embodiments, the interaction work performance may include one or more outcomes of a call. For example, in particular embodiments, the outcomes may include one or more of the particular call being answered, a callback being requested, an appointment being setup, or some other of type of termination of the particular call. In other embodiments, the outcomes may include one or more of a sale occurring, a number of sales reaching a predefined number, a monetary value of a sale equaling at least a predefined amount, or a number of items for a sale being at least a predefined number. In these particular embodiments, the interactive interface may be displayed as a result of the measurement of the interaction performance parameter for a particular call handled by the agent resulting in one of the outcomes.

Further, in various embodiments, second display criteria for providing the interactive interface may be defined and/or recorded. In these particular embodiments, the second display criteria may be related to a second display performance parameter associated with the plurality of call center agents. Likewise, in various embodiments, second interaction criteria may be defined and/or recorded. In these particular embodiments, the second interaction criteria may be used for providing a second opportunity to interact with the interactive interface to win a second award. Further, in these particular embodiments, the second interaction criteria may be related to a second interaction performance parameter associated with the plurality of call center agents.

For particular embodiments involving the second display criteria and/or second interaction criteria, the process for providing the interactive interface to the particular agent may involve providing the interactive interface on a computer workstation used by the agent, awarding the agent with the second award based on the agent's second interaction with the interactive interface, and tracking and reporting the awarding of the second award to the agent. In these particular embodiments, one or more steps of the process may be performed as a result of a measurement of the second display performance parameter for the particular agent meeting the second display criteria and/or a measurement of the second interaction performance parameter for the particular agent meeting the second interaction criteria during the time period.

Further, embodiments of the present invention provide computer program products, methods, systems, apparatus, and computing entities for providing an interactive interface to a particular agent from a plurality of call center agents of a call center that define a first award and a second award. In these particular embodiments, the process for awarding the particular agent involves awarding the agent with the first award based on the agent's interaction with the interactive interface and a measurement of a interaction performance parameter meeting a first result or awarding the agent with the second award based on the agent's interaction with the interactive interface and the measurement of the interaction performance parameter meeting a second result.

Finally, embodiments of the present invention provide computer program products, methods, systems, apparatus, and computing entities for providing an interactive interface to a particular agent from a plurality of call center agents of a call center that define criteria for providing the interactive interface on any of a plurality of computer workstations used by the plurality of call center agents. In these particular embodiments, the criteria may be related to a performance parameter associated with the plurality of call center agents.

Depending on the embodiment, the process for providing the interactive interface to the particular agent may involve scheduling a time period for making the interactive interface available to the call center agents. Further, the process may involve providing the interactive interface on a computer workstation used by the particular agent, awarding the agent with an award based on the agent's interaction with the interactive interface, and tracking and reporting the awarding of the award to the agent. In particular embodiments, one or more steps of the process may be performed as a result of a measurement of the performance parameter for the agent meeting the criteria during the time period.

This summary is provided to exemplify concepts at a high level form that are further described below in the detailed description section. The summary is not intended to identify key or essential features of the claimed subject matter, nor is it intended to be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 8 is a second screen display of the second interactive interface shown in FIG. 7 in accordance with various embodiments of the present invention.

DETAILED DESCRIPTION

Figure 1:
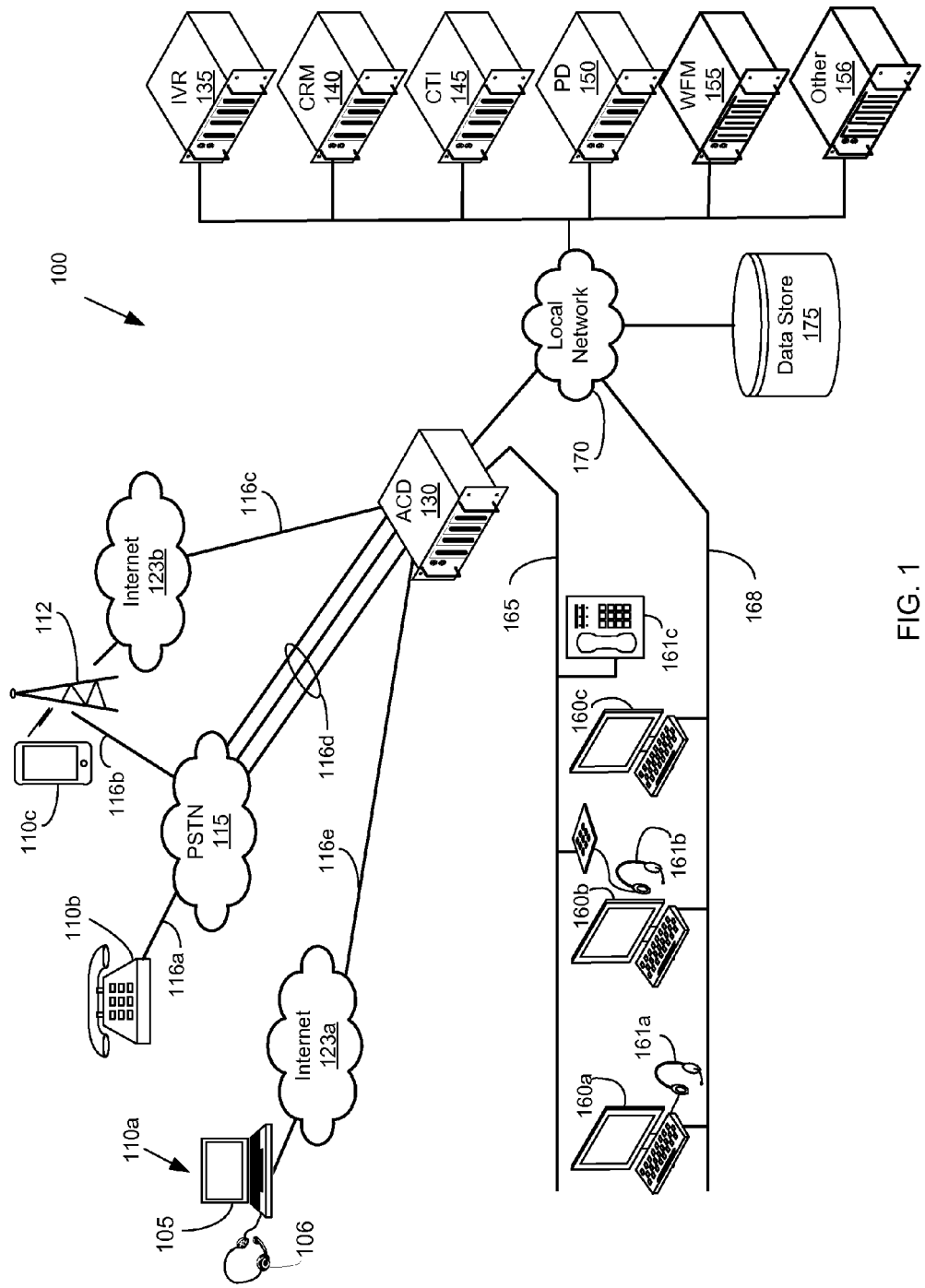
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

FIG. 1 shows one embodiment of a call center architecture 100 illustrating the various technologies disclosed herein. The call center shown in FIG. 1 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. Since the call center may handle calls originating from a calling party, or initiated to a called party, the term "party," without any further qualification, refers to a person associated with a call processed by the call center, where the call is either received from or placed to the party. The term "caller," if used, will generally refer to a party calling the call center, but in many cases this usage is exemplary. Thus, use of the term "caller" is not intended to limit the concepts to only inbound calls unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a mobile device 110c, such as a smart phone or tablet, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time-division multiplexing ("TDM") technology.

Inbound voice calls may also originate from a calling party employing a so-called "IP phone," "VoIP phone," or "soft phone" 110a. In one embodiment, this device may comprise a computing device 105, such as a laptop or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a mobile device 110c, or other device known in the art. The term "call" as used herein may mean an active instance of two-way communication, an attempt to establish two-way communication, or a portion of the two-way communication. For example, a user at a conventional telephone 110b can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, for example, text messages, video chat, facsimile, etc.

In various embodiments, inbound calls from callers to the call center may be received at an automatic call distributor ("ACD") 130. In particular embodiments, the ACD 130 may be a specialized switch for receiving and routing inbound calls under various conditions. Further, the ACD 130 may be embodied as a dedicated form of equipment readily available from various manufacturers, or the ACD 130 may be a so-called "soft switch" comprising a suitable programming module executed by a processing device to perform the necessary functions. The ACD 130 may route an incoming call over call center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the ACD 130.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a computing device 160a-160b, such as a computer, and a voice device 161a-161c. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations prior to handling calls. This allows the call center to know which agents are available for handling calls. In particular embodiments, the ACD 130 may also maintain data of an agent's skill level that may be used to route a specific call to the agent or group of agents having the same skill level. In particular instances, if a suitable agent is not available to handle a call, the ACD 130 may queue the call for the next available agent. As can be expected, various algorithms may be employed to process calls in an efficient manner.

In various embodiments, two types of signaling information may be provided with an inbound call that may be used by the ACD 130 in processing the call. The first type of signaling information indicates the telephone number dialed by the caller, and is frequently referred to as "DNIS," derived from the Dialed Number Identification Service associated with this capability. For example, in particular instances, a call center may provide various services, such as sales, customer service, technical support, etc., each of which may be associated with a different telephone number (e.g., multiple toll free "800" numbers). In these instances, the ACD 130 may use the DNIS to determine the purpose of the call, and potentially identify a group of agents having the appropriate skill level to handle the call. Thus, in various embodiments, the ACD 130 may prioritize and route calls to an agent based on the required skill level. Skills-based routing may be a rule-based set of instructions that the ACD 130 uses to handle calls. Depending on the embodiment, skills-based routing may be implemented by the ACD 130, or by the ACD 130 interacting with a computer-telephone integrated ("CTI") server 145.

In various embodiments, the CTI server 145 may be incorporated in the call center architecture 100 to control and/or coordinate other components of the architecture 100. Specifically, the CTI server 145 may interact with the ACD 130 to coordinate call processing. Thus, in particular embodiments, the CTI server 145 may control routing of calls from the ACD 130 to the various agent workstations and/or may provide data to other components processing the calls. The CTI server 145 may also provide call reporting functionality based on data collected during calls.

The second type of signaling information that may be provided with an inbound call is the calling telephone number, often referred to as automatic number identification or "ANI." In particular embodiments, the ACD 130 and/or CTI server 145 may use the ANI of an incoming call to retrieve caller information from a data store 175 and provide the data to an agent's workstation computer 160a-160c over facilities 168 along with routing the call to the agent's workstation phone 161a-161c. Further, in particular embodiments, the ANI may also be used to ascertain a party's status (e.g., a "Gold Level" customer warranting premium service) and/or to facilitate the ACD 130 routing the call to a select group of agents. Depending on the embodiment, the data store 175 may include one or more databases storing different information such as, for example, records of caller information. Further, the data store 175 may be integrated with the CTI server 145, the ACD 130, or segregated as a standalone medium or media.

In various embodiments, the ACD 130 may place a call in a queue if there are no suitable agents available, and/or it may route the call to an interactive voice response server ("IVR") 135 to play voice prompts. In particular embodiments, these prompts may be in a menu type structure and the IVR 135 may collect and analyze responses from the party in the form of dual-tone multiple frequency ("DMTF") tones and/or speech. In addition, the IVR 135 may be used to further identify the purpose of the call, such as, for example, prompting the party to enter account information or otherwise obtain information used to service the call. Further, in particular embodiments, the IVR 135 may interact with other components, such as the CTI server 145 or the data store 175, to retrieve or provide information for processing the call. In other configurations, the IVR 135 may be used to only provide announcements.

Depending on the embodiment, the interaction between the ACD 130, IVR 135, CTI server 145, agent computers 160a-160c, as well as other components, may involve using a local area network ("LAN") 170. However, other configurations are possible, such as, but not limited to, using a wide area network, wireless network, router, bridge, direct point-to-point links, etc.

In particular embodiments, when an agent is interacting with a called or calling party, the agent may use his workstation computer 160b to further interact with other enterprise computing systems, such as, for example, a customer relationship management ("CRM") server 140. A CRM server 140 may be used to integrate information from various enterprise business systems to facilitate the agent servicing the call. In addition, the CRM server 140 may provide a variety of applications.

In addition to receiving inbound communications, including, for example, voice calls, emails, text messages, and facsimiles, the call center may also originate communications to a called party, referred to herein as "outbound" communications. In some embodiments, a call center may employ a predictive dialer ("PD") 150 to originate outbound calls on behalf of an agent at a rate designed to meet various criteria. Similar to the other components within the call center architecture 100, depending on the embodiment, the PD 150 may comprise one or more software modules executing on a processing device hardware platform.

In various embodiments, the PD 150 is typically configured to dial a list of telephone numbers to initiate outbound calls, which can be accomplished by instructing the ACD 130 to originate the calls. Thus, in some embodiments, the ACD 130 may include functionality for originating calls, and if so, this functionality may be referred to as a private automatic branch exchange ("PBX" or "PABX"). In other embodiments (not shown), the PD 150 may directly interface with voice trunks using facilities 116c, 116d, 116e to the PSTN 115 and/or Internet providers 123b for originating calls. After the calls are originated, a transfer operation by the ACD 130 may connect the call with an agent, or place the call in a queue for an available agent. In the latter case, announcements or music may be provided to the party. In various embodiments, the PD 150 may make use of one or more algorithms to determine how and when to dial a list of numbers so as to minimize the likelihood of a called party being placed in a queue while maintaining target agent utilization.

Another server that may be employed in the call center architecture 100 is a workforce management ("WFM") server 155. In various embodiments, this server 155 maintains information to generate agents' schedules to effectively handle inbound/outbound calls. For instance, in particular embodiments, the WFM server 155 may maintain historical call volume information for call campaigns and may forecast expected call volume to predict the number of agents needed to handle the call volume at a defined service level. The WFM server 155 may then apply information about available agents to generate a work roster of agents. In other words, the WFM server 155 may schedule agents for their work shifts according to the anticipated needs of the call campaigns.

Finally, in various embodiments, the call center architecture 100 may include one or more other servers 156 to perform various functions. For example, in one particular embodiment, the call center architecture 100 includes a server 156 to serve as a quality assurance system that records communications fielded by agents and/or allows managers to monitor communications to ensure these communications are being handled correctly.

Although the above components are referred to as "servers," each may be also referred to in the art as "units" or "systems." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, IVR 135, CRM server 140, CTI server 145, PD 150 and/or WFM server 155 may be combined into a single hardware platform executing one or more software modules. In addition, the call center architecture 100 may be provided as a hosted solution, where the call processing functionality is provided as a communication service (a so-called "communication as a service" or "CaaS") to a call center operator. Thus, there is no requirement that the servers identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences.

Those skilled in art will recognize FIG. 1 represents one possible configuration of a call center architecture 100, and that variations are possible with respect to the protocols, facilities, components, technologies, and equipment used. For example, various algorithms and queuing arrangements may be defined to efficiently process calls. In other configurations, the ACD 130 may be configured to process not only voice calls, but also other forms of communication, and perform corresponding call processing functions for email, text, chats, or facsimile calls. Alternatively, a web server (not shown in FIG. 1) may receive or originate email, chats, and text communications, as well as interact with other call center components.

Exemplary System Operation

The logical operations described herein are implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Interface Development Module

Figure 2:
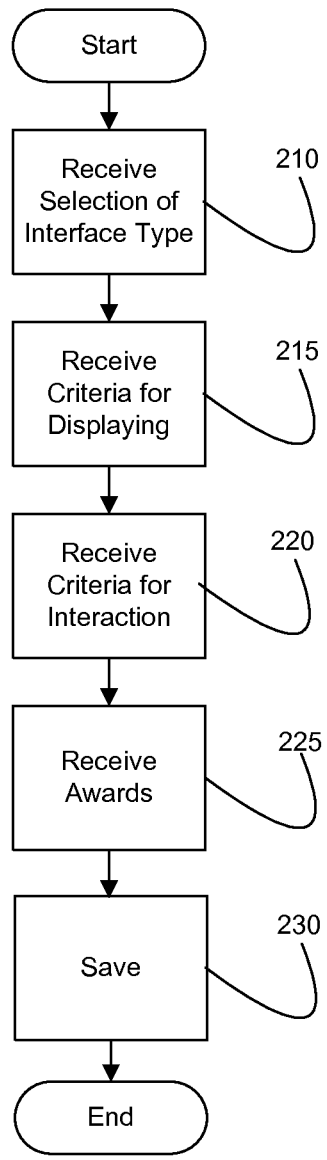
FIG. 2 is a flowchart illustrating an interface development module that can be used in accordance with various embodiments of the present invention.

Turning now to FIG. 2, additional details will be provided regarding the process flow for developing interactive interfaces. In particular, FIG. 2 is a flow diagram showing an interface development (ID) module for performing such functionality according to one embodiment of the invention. For example, the flow diagram shown in FIG. 2 may correspond to steps carried out by a processor in a computing device, such as the WFM server 155, as it executes the ID module stored in the computing device's volatile and/or nonvolatile memory. In various embodiments, to facilitate the design and development of an interactive interface, a user, such as a call center administrator for example, is provided with a design interface in communication with the ID module. The design interface may comprise one or more screens from which the user may design and develop an interactive interface to be used in conjunction with an agent's workstation during the agent's workday.

In various embodiments, the first step in developing an interactive interface is selecting the interactive interface type. Accordingly, depending on the embodiment, the design interface may provide the user with a number of different options for the interactive interface type. For instance, in particular embodiments, the design interface may provide the user with any number of interactive interface types that include a game of chance for the agent to play when the interface appears on the agent's workstation. Games of chance are generally understood to be games that involve some outcome strongly influenced by some random factor out of the control of the player. For example, games of chance may include card games, dice games, roulette, and baccarat. In addition, in various embodiments, the design interface may provide the user with interactive interface types that include games of skill in addition to or instead of games of chance. Games of skill are generally understood to be games that involve some outcome that is determined mainly by one or more mental and/or physical skills of the player. For example, games of skill may include checkers, chess, trivia, and tic-tac-toe.

Further, depending on the embodiment, the design interface may provide the user with a number of options to identify the desired interactive interface type. For example, in one embodiment, the design interface may include a dropdown option from which the user may select the desired interactive interface type. While in another embodiment, the design interface may provide a listing of available interactive interface types, and the user selects the desired type by checking a corresponding checkbox by the desired interactive interface type. While in another embodiment, the design interface provides drag-and-drop functionality and the user drags and drops the desired interactive interface type from a listing onto a design screen. Thus, the user selects the desired interactive interface type and the ID module receives the selection, shown as Step 210.

Next, the user enters criteria for displaying the interactive interface and the ID module receives the criteria, shown as Step 215. The display criteria define what actions and/or conditions must occur in order for the interactive interface to be made available to an agent. For instance, during a call center campaign, the call center operator may only want the interactive interface to become available to an agent after every fifth call the agent has fielded. That is, for example, the call center operator may only want the interactive interface to popup on the agent's workstation after every fifth call fielded by the agent. Thus, the display criteria control how often an agent is given an opportunity to interact with a particular interface.

It should be noted that making the interactive interface available to an agent may differ in various embodiments. For instance, in certain embodiments, making the interactive interface available to an agent involves having the interface popup and display on the agent's workstation automatically. While in other embodiments, making the interactive interface available to an agent involves providing some mechanism to the agent so that the agent may open and display the interface on his workstation, such as, for example, a button on the agent's workstation that the agent may select.

Similar to the selecting the interface type, the design interface may be configured in a number of different ways that allow the user to enter the display criteria. For instance, in one embodiment, the display criteria may be pre-defined and the user simply selects the appropriate criteria. In other embodiments, the user may have more freedom to define the display criteria. For example, in one embodiment, the design interface may provide the user with ad hoc capabilities so that the user may enter criteria that apply to a specific solution. Further, in various embodiments, the criteria may be related to performance parameters associated with agents. For example, the criteria may include a field that defines the number of calls that need to be handled (e.g., fielded) by an agent before the interactive interface is made available to the agent. In this particular example, the user may enter a zero to indicate that the interface should be made available to the agent after every call the agent fields. The user may enter a number (e.g., 1, 2, or 3) to indicate how many calls should be skipped before the interface is made available to the agent. For instance, if the user enters the number two, the interface will be made available to the agent after every third call fielded by the agent.

In addition, depending on the embodiment, other performance parameters may be set for the criteria described above. For example, in one embodiment, the user may not only indicate how many calls must be fielded before the interface is made available, but may also indicate how the calls should be fielded before the interface is made available. For instance, each call fielded by an agent may have a termination code indicating the outcome of the call. For example, the outcome of the call may have been the party requesting a callback, the party not answering the call, the phone line being busy, the party indicating not to be called, the party setting up an appointment, an answering machine answering the call, the phone line becoming disconnected, and so forth.

The performance parameters could also be based on non-voice call related activities performed by the agent. For example, the performance parameters could specify a number of emails from users that are processed or resolved by the call agent. The performance parameters could specify a number of chat sessions that the agent must be involved with, or short message service messages that are handled. Although the embodiments illustrated herein are presented in the context of the agent handling voice calls for purposes of illustration and not for limitation, those skilled in the art will recognized in light of the present disclosure that the principles of the technologies disclosed herein can be applied to a variety of tasks routinely handled by a call center agent.

Thus, the user may select one or more of these termination codes to indicate the call must result in a particular outcome for the call to count towards making the interactive interface available to an agent. For example, if the user selects the termination codes associated with the outcome being one of the party requesting a callback, the party answering the call, or the party setting up an appointment and a call is fielded by an agent that is terminated because the party does not answer the call, then the call will not count towards the requirement to make the interactive interface available to the agent. Depending on the embodiment, at the end of a call, the agent may be provided with one or more screens that allow the agent to select the outcome of the call or one or more components of the call center architecture 100 may monitor certain parameters to determine the outcome of the call.

It should be apparent to those of ordinary skill in the art in light of this disclosure that other types of performance parameters may be used as display criteria besides phone calls and/or termination codes. For example, in various embodiments, display criteria may be based on a sale occurring, a number of sales reaching a predefined number, a monetary value of a sale equaling at least a predefined amount, a number of items for a sale equaling at least a predefined number, a number of appointments set up by parties reaching a predefined number, a number of callbacks requested by parties reaching a predefined number, and so-forth. Further, in particular embodiments, the criteria may be related to other performance parameters not directly linked to work performance, such as the completion of an online training session by an agent. Therefore, the specific criteria described above are only provided as examples of display criteria that may be used and should not be construed to limit the scope of the invention.

Further, in various embodiments, multiple interactive interfaces may be made available to agents at the same time during a campaign. For these particular embodiments, the user may also set a parameter (e.g., field) to indicate whether particular criteria (e.g., fielded calls) count towards making multiple interactive interfaces available or whether the criteria only count towards making one or more particular interactive interfaces available. Thus, in particular embodiments, criteria may be set up for multiple interactive interfaces or may be set up for individual interactive interfaces.

Retuning now to FIG. 2, in Step 220, the ID module receives criteria for interaction. In various embodiments, in addition to providing display criteria for making the interactive interface available to agents, the user may also provide interaction criteria for providing an agent an opportunity to interact with the interactive interface. Thus, in these particular embodiments, once an agent is provided the opportunity to interact with a particular interactive interface, the agent engages in some type of interaction with the interface, and based on the interaction, the agent may win an award.

Similar to the display criteria, in various embodiments, the interaction criteria may also involve performance parameters associated with agents, such as the performance parameters already discussed with respect to the display criteria as well as other performance parameters. For example, the user may set up display criteria for making the interactive interface available to an agent for every fifth call fielded by an agent, and the calls that count are calls that result in an outcome of a party answering the call, a party requesting a callback, or a party setting up an appointment. Further, the user may set up interaction criteria that require the outcome of the fifth call to be either the party requesting a callback or the party setting up an appointment. Therefore, in this example, if an agent fields his fifth call and the outcome of the call is the party setting up an appointment, the agent is provided the opportunity to interact with the interface.

As described in further detail below, in various embodiments, the interaction may entail any number of different actions, interplays, contacts, interchanges, or exchanges with the interactive interface. For instance, in one embodiment, the interface may be a roulette wheel that has monetary values set for each section of the wheel. Therefore, the agent is provided the opportunity to "spin the roulette wheel" as a result of the fifth call's outcome meeting the interaction criteria. The agent clicks on a button entitled "SPIN" on the interactive interface and the wheel spins and stops on a particular section of the wheel having a particular monetary amount. As a result, the agent is awarded the particular monetary amount as a bonus in addition to the agent's normal pay.

Further, the interaction criteria may be defined for different levels. For instance, in one embodiment, the interaction criteria may be defined so that an agent is provided the opportunity to interact with the interface the first time as a result of the outcome of the fifth call being an answered call, a party requesting a callback, or a party setting up an appointment. However, after the first interaction, the agent is only provided subsequent interactions if the outcome of the fifth call results in a party requesting a callback or a party setting up an appointment. As described in greater detail below, in particular embodiments, each time an agent is provided an opportunity to interact with the interface, the agent's interaction information is stored so that such information may be referenced. As a result, such storage allows for components of the call center architecture 100 to implement different levels of criteria. As can be envisioned, similar to the interaction criteria, different levels of display criteria may also be defined in various embodiments.

In Step 225, the ID module receives the awards information defining what the awards are for the particular interactive interface. Depending on the embodiment, the awards may comprise any number of different items such as, for example, money, extra break time, paid time off, dinner, event tickets, and so-forth. For instance, returning to the example involving the roulette wheel, the user enters a list of awards that may be available on the roulette wheel such as $1, $2, and $3. Next, the user enters values to define the relative odds of winning each award. The user enters a percentage for each award such as 50% for $1, 30% for $2, and 20% for $3. As a result, the ID module configures the roulette wheel to have three sections, the first section is allotted half the wheel (50%) and has a monetary value of $1, the second section is allotted 30% of the wheel and has a monetary value of $2, and the third section is allotted 20% of the wheel and has a monetary value of $3. Thus, by entering the values (e.g., percentages) associated with the different awards, the user has dictated the odds of winning each award.

As one of ordinary skill in the art can envision in light of this disclosure, the awards on the wheel may cover a range of different awards in both amount and type. For example, the awards may not only be monetary, but may also include other types of awards such as gift certificates, dinners, event tickets, and so forth. In addition, the awards may not be awards at all, per se, but instead may include instances in which the agent is not a winner. For example, one or more sections of the wheel may be marked with a message that reads, "Sorry you are not a winner at this time, please qualify and try again!"

As will be understood by those of ordinary skill in the art, similar to the display criteria and the interaction criteria, the awards may be defined for different levels. For instance, returning to the example, the first time an agent qualifies for an award and "spins" the roulette wheel, the sections may be marked as $1, $2, and $3. Each time thereafter, the sections may be marked as $2, $3, and $4. Further, depending on the embodiment, the user may be able to set other features for the interactive interface by using the design interface. For example, the user may be able to specify font types for text, screen colors, and other visual features. In addition, the user may be able to specify sounds for various features of the interface, such as sounds of the roulette wheel turning and/or voice simulations informing the agent he is a winner.

At this point, the user may select to save the interactive interface (e.g., the user may click the "SAVE" button on a screen of the design interface). Accordingly, the ID module saves the information (e.g., the interactive interface type, criteria, and other feature data) for the interface, shown as Step 230. Following the step of saving the information for the interactive interface, the interface is now available for use with one or more campaigns conducted by the call center.

Interface Installation Module

Figure 3:
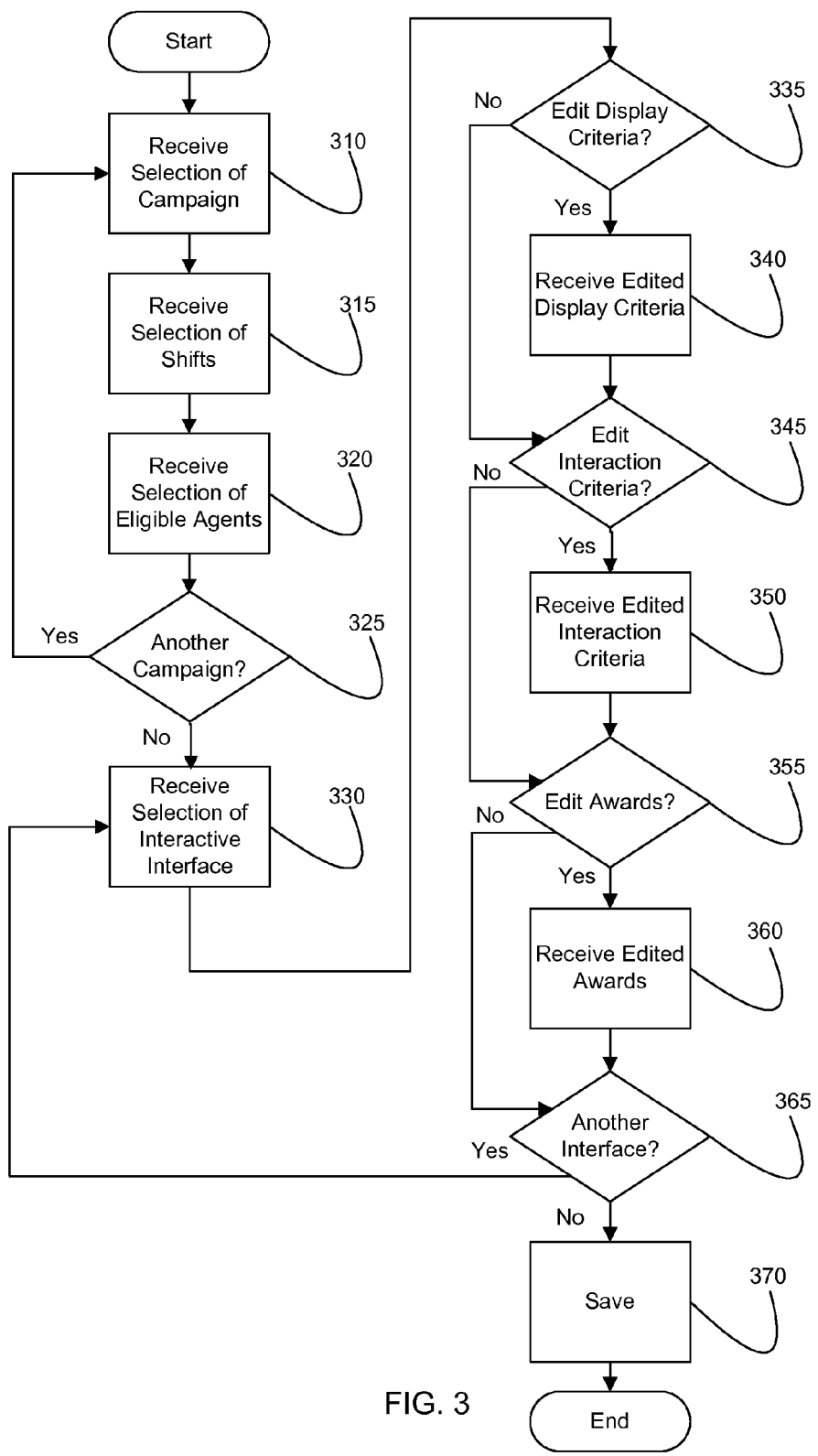
FIG. 3 is a flowchart illustrating an interface installation module that can be used in accordance with various embodiments of the present invention.

Turning now to FIG. 3, additional details will be provided regarding the process flow for installing interactive interfaces for one or more campaigns. The term "campaign" generally is understood to mean a set of parameters that define communications to take place to achieve a marketing and/or information activity such as, for example, placing calls, receiving calls, and/or and sending emails to a number of customers of an insurance company to inform them of a new insurance product they may purchase. The parameters of a campaign generally define the who, what, and when of the campaign. For instance, the parameters of a campaign may define who will make/receive the communications (e.g., parties, phone numbers, and/or email addresses), the content of the communications, and the time period in which the communications will be handled.

FIG. 3 is a flow diagram showing an interface installation (II) module for performing functionality associated with installing interactive interfaces for one or more campaigns according to one embodiment of the invention. Accordingly, the flow diagram shown in FIG. 3 may correspond to steps carried out by a processor in a computing device, such as the WFM server 155, as it executes the II module stored in the computing device's volatile and/or nonvolatile memory.

In various embodiments, the user opens a design interface associated with the II module, similar to or the same as the design interface used in conjunction with the ID module. In particular embodiments, the WFM server 155 possesses access to information on campaigns that have been built by one or more users on the WFM server 155. Thus, a user may use the design interface to view and select a particular campaign to have one or more interactive interfaces installed. As can be envisioned by those of ordinary skill in the art, the design interface may utilize any number of mechanisms for displaying and allowing selection of the campaign. For instance, in one embodiment, the design interface may make use of a drop-down menu that lists all of the active campaigns that have been built for the call center and the user selects the desired campaign from the listing. As a result, in Step 310, the II module receives the selection of the campaign.

In various embodiments, the parameters of the campaign typically define the time period for which the campaign will run, the shifts that will occur during the time period, and the agents that will be assigned to the shifts. Therefore, the user can simply indicate that the interactive interface(s) will be active for the entire time period and for all the agents during all of the shifts. However, in some instances, the user may not wish to have the interactive interface active for the entire campaign. Therefore, in various embodiments, the user may indicate what shifts (e.g., time periods during the campaign) the user would like to make the interactive interface available and/or which agents the user would like to make the interactive interface available to. For example, the call center operator may wish to implement an interactive interface that is active only during the week of Christmas as a reward for those agents who are willing to work this week, since the week is a popular time for agents to request vacation.

In such cases, the user indicates the desired shifts and/or agents. For example, in one embodiment, the design interface provides a listing of the shifts and/or agents along with checkboxes for each shift and/or agent and the user simply checks the appropriate boxes. As a result, the II module receives a selection of the shifts and/or eligible agents, as shown in Steps 315 and 320. It should be noted that in particular embodiments, the user may indicate criteria for identifying eligible shifts and/or agents instead of identifying the specific shifts and/or agents, themselves. Therefore, for these particular embodiments, the shift criteria and/or agent criteria are considered in determining whether an agent is eligible to have the interface made available to him.

Next, if the user would like to apply the interactive interface to more than one campaign, the user indicates on the design interface that he would like to select another campaign. As a result, in Step 325, the II module determines the user wishes to select another campaign and the module returns to Step 310 of the process flow. As this point, the process flow repeats as described above until the user has finished selecting all of the campaigns for which to apply the interactive interface.

The user then selects the desired interactive interface he wishes to install in the selected campaign(s). As previously described, in many instances, the interactive interfaces have been previously built and the user simply selects the designed interface from a library of available interfaces. However, in some embodiments, the design interface used for installing an interactive interface into one or more campaigns may also include one or more screens configured to allow the user to build a new interface from scratch. Once the user selects an interface, the II module receives the selection, shown as Step 330. For instance, returning to the previous example involving an interactive interface for a roulette wheel, the user selects the roulette wheel interface and the II module receives the selection.

At this point, the user may wish to install the interface with the criteria and awards already defined for the interface, such as the display criteria, the interaction criteria, and the awards, themselves. However, in various embodiments, if the user wishes to edit any of the criteria and/or awards, the design interface provides capabilities so that the user may do so. Therefore, in these particular embodiments, the II module determines whether the user would like to edit the display criteria, shown as Step 335. If so, the II module then receives the edited display criteria, shown as Step 340. For example, returning to the roulette wheel interface, the display criteria was defined as making the interface available to an agent for every fifth call fielded by the agent in which the outcome of the call resulted in a party answering the call, a party requesting a callback, or a party setting up an appointment. The user may wish to change the criteria to every fourth call. The user edits the display criteria and, accordingly, the II module receives the edited criteria with the number of calls changed to every fourth call fielded by an agent instead of every fifth call.

As mentioned, the II module may also be configured in various embodiments to allow the user to edit the interaction criteria and the awards. Thus, in Step 345, the II module determines whether the user would like to edit the interaction criteria. If so, the II module receives the edited interaction criteria, shown as Step 350. Similarly, in Step 355, the II module determines whether the user would like to edit the awards. If so, the II module receives the edited awards, shown as Step 360. It should be noted that depending on the embodiment, the edited criteria and/or awards may be saved in place of (e.g., overwrite) the original criteria and/or awards for the interactive interface or the edited criteria, along with the other information on the interface, may be saved as a new interactive interface. Thus, in particular embodiments, the interactive interfaces built through the ID module may also serve as templates that can be used to build specific interfaces for particular campaigns.

At this point, the user may wish to install an additional interactive interface into the campaign(s). Therefore, in Step 365, the II module determines whether the user wishes to install another interactive interface. If so, the II module returns to the point in the process where the user selects the interactive interface (Step 330) and the process described above is repeated for the newly selected interface. Once the user is done selecting interfaces, the II module saves the information on the selected campaign(s) and interactive interface(s), shown as Step 370. As a result, the selected interfaces are inserted (installed) in the operational screens to be used by the agents during the campaign(s) so that the interfaces can be made available to the agents during the campaign(s).

It should be noted that during the campaign(s), in various embodiments, the one or more components of the call center architecture 100 used to control the call center process for communications are configured to monitor the display and interaction criteria and to take the appropriate actions (e.g., display the interactive screen and/or issue the awards) based on the criteria. For instance, as described in greater detail below, the CTI server 145 in particular embodiments may be configured to carry out such functionality.

Interactive Interface Execution Module

Figure 4:
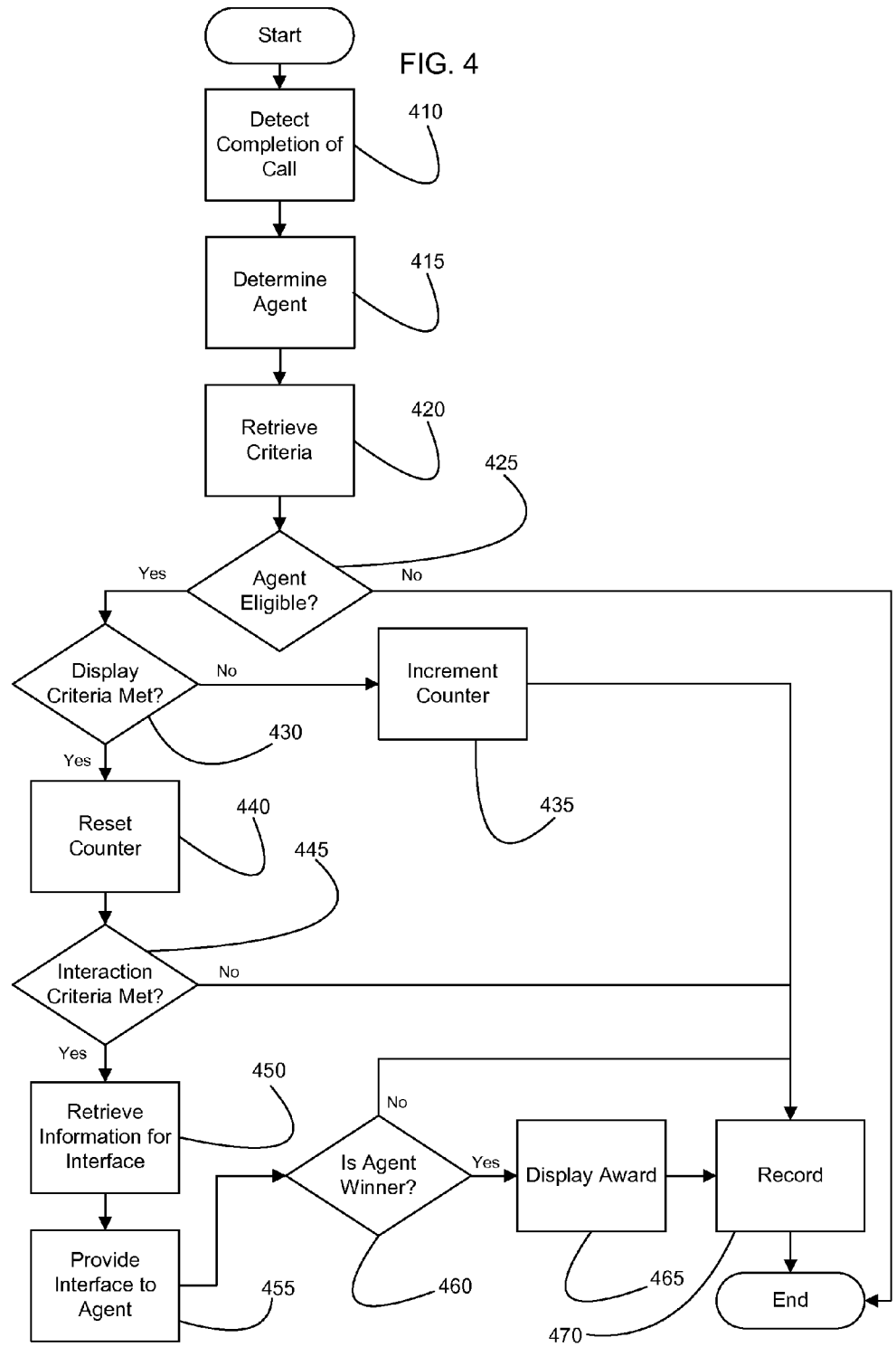
FIG. 4 is a flowchart illustrating an interactive interface execution module that can be used in accordance with various embodiments of the present invention.

Turning now to FIG. 4, additional details will be provided regarding the process flow for executing interactive interfaces during one or more campaigns. Specifically, FIG. 4 is a flow diagram showing an interactive interface execution (IIE) module for performing functionality associated with executing interactive interfaces during one or more campaigns according to one embodiment of the invention. Accordingly, the flow diagram shown in FIG. 4 may correspond to steps carried out by a processor in a computing device, such as the CTI server 145 or an agent's computer 160a-160c, as it executes the IIE module stored in the computing device's volatile and/or nonvolatile memory. Further, in particular embodiments, a call center hosting arrangement can provide the interactive interface to an agent by interacting with a browser window and using HTML/JavaScript protocols on the agent's computer 160a-160c.

As will be apparent to those of ordinary skill in the art in light of this disclosure, the IIE module may be configured to detect various features of communications in order to evaluate whether to make an interactive interface available for a particular agent. For instance, in particular embodiments, the IIE module may be configured to detect when an agent has opened an email from a party or has sent an email to a party. Thus, with respect to the process flow described in FIG. 4, the IIE module is configured to detect the completion of calls either received from or sent to various parties. Although, as mentioned, it should be understood that in various embodiments, the IIE module may be configured to detect other features of communication, such as for example, calls being answered, average call handling time, call disposition, text messages being answered, sales being made, appointments being setup, etc.

Looking at FIG. 4, the IIE module detects the completion of a call within the call center architecture 100, shown as Step 410. For example, in one embodiment, the IIE module may detect when a particular call has been disconnected between an agent and a party. The disconnection may have occurred for a number of different reasons. For instance, the disconnection may have occurred because the agent and the party were through with the call and the two mutually hung up the call, or the disconnection may have occurred because no one answered the call or the number dialed may have been disconnected and no longer in service. While in another example, the IIE module may detect the completion of the call as a result of the agent handling the call setting an indicator that the call has been completed.

After detecting the completion of the call, the IIE module determines the agent associated with the completed call, shown as Step 415. For instance, in one embodiment, each agent is associated with a unique identifier such as a payroll number. When a particular call is route to an agent, the call is associated with the unique identifier within the call center architecture 100. That is, for example, an identifier for the call is associated with the unique identifier for the agent and the relationship is stored in a record in a database located on some data store 175 within the call center architecture 100. In this particular instance, the IIE module queries the database for the unique identifier for the agent to determine what agent handled the call.

Next, the IIE module retrieves the criteria associated with the appropriate interactive interface, shown as Step 420. For instance, in particular embodiments, the IIE module retrieves display criteria, interaction criteria, and/or any other applicable criteria. Depending on the embodiment, the IIE module may retrieve the criteria based on certain information that pertains to the particular agent. For instance, as previously described, the interactive interface may be configured to have different levels of display criteria and/or interaction criteria based on the agent's history with the interactive interface. For example, the interactive interface may be configured with a first set of display criteria to be used for making the interface available to an agent a first time and a second set of display criteria to be used for making the interface available to the agent for any subsequent times. Therefore, the IIE module may first query information on the agent's history on interacting with the interface to determine which criteria are appropriate to apply to the call. It should be noted that in some embodiments, the IIE module may not only query information to determine the appropriate criteria, but may also query information to determine the appropriate interface to apply to the call.

Following retrieval of the criteria, the IIE module determines whether the agent is eligible to have the interactive interface made available to him, shown as Step 425. Thus, in various embodiments, the retrieved criteria may include information that specifically indicates whether the agent is eligible. While in other embodiments, the retrieved criteria may include shift criteria and/or agent criteria that provide conditions the agent must meet in order to eligible. For example, the agent criteria may indicate that an agent must be on a particular team in order to have the interactive interface made available to him. Therefore, if the IIE module determines the agent is not eligible, the IIE module exits without performing further steps to make the interface available to the agent.

However, if the IIE module determines the agent is eligible, the IIE module determines whether the display criteria for the interactive interface have been met, shown as Step 430. As previously mentioned, the display criteria provide the actions and/or conditions that must occur before the interactive interface is made available to the agent. For example, in one embodiment, the criteria may be set to provide the interface to the agent for every fourth call handled by the agent wherein the outcome of the call resulted in the call being answered by the called party, the called party requesting a callback, or the called party setting up an appointment. In various embodiments, the display criteria are usually defined for one or more particular interactive interfaces. However, in other embodiments, the display criteria may be generally defined for any interactive interface that may be associated with the current campaign.

Depending on the embodiment, the IIE module may make such a determination in a number of different ways. For example, in one embodiment, once the called party decides to set up an appointment to have a follow-up call with a sales representative, the agent brings up a calendar application on his workstation to set a date for the follow-up call. The calendar application may be populated with information on when sales representatives will be available to place follow-up calls. The agent looks at the calendar, discusses with the party when the sales representatives will be available, and receives a particular date and time from the party on when the follow-up call should be placed to the party. The agent then enters the follow-up call information (e.g., the party's identity, phone number, call identifier, agent identifier, and reason for the follow-up call) on the calendar, and the information is saved into a data store 175 within the call center architecture 100. As a result, the IIE module may then query the data store 175 in particular embodiments to determine that the outcome of the call was the called party setting up an appointment to have a follow-up call with a sales representative.

In another embodiment, once the call has been completed, a screen is provided on the agent's workstation listing the possible outcomes for the call. The agent simply selects the outcome that indicates the call ended with the called party setting up an appointment on the screen and saves the information to the data store 175. Accordingly, the IIE module may then query the data store 175 to determine the outcome for the call was the called party setting up an appointment to have a follow-up call with a sales representative.

Further, in various embodiments, the IIE module may obtain information on the agent's status with respect to having the interactive interface made available to the agent. Returning to the example, the display criteria indicate that the interface should be made available to the agent for every fourth call handled by the agent that involves the outcome of the call resulting in the call being answered by the called party, the called party requesting a callback, or the called party setting up an appointment. In particular embodiments, a counter for the agent may be used to keep track when the fourth call that qualifies to make the interface available to the agent. Similar to other information described above, the counter may be stored in a data store 175 within the call center architecture 100 or may be stored on some other component, such as the agent's own workstation. Thus, when a call qualifies towards the agent's count for making the interactive interface available to the agent and the current counter does not met the requirements set for the display criteria (e.g., the counter is less than three), the IIE module increments the counter by one, shown as Step 435.

Once the IIE module increments the counter, the IIE module then records the counter so that the counter may be referenced for the next qualifying call for the agent, shown as Step 470. Further, depending on the embodiment, the IIE module may record additional information about the call handled by the agent such as, for example, the date and time the call was concluded and the outcome of the call. It should be noted that the display criteria do not always include a counter in every embodiment of the invention and, therefore, the counter is only one example of the type of display criteria that may be implemented for any given embodiment.

If the IIE module determines the display criteria are met, the IIE module resets the counter, shown as Step 440. Thus, in particular embodiments, the IIE module sets the counter for the agent back to zero. Again, similar to the IIE module incrementing the counter, the step of resetting the counter may or may not be performed by the IIE module, depending on how the display criteria have been defined for the interactive interface.

Next, the IIE module determines whether the interaction criteria have been met, shown as Step 445. Similar to the display criteria, in various embodiments, the interaction criteria is usually defined for one or more specific interactive interfaces. However, in other embodiments, the interaction criteria may be generally defined for all of the interactive interfaces associated with the current campaign. The interaction criteria define the conditions that must be met to provide the agent an opportunity to interact with the interface (e.g., to allow the agent to play the game). For example, in one embodiment, the criteria may be set to allow the agent to interact with the interface if the call handled by the agent resulted in the called party requesting a callback or setting up an appointment.

If the IIE module determines the interaction criteria have been met, depending on the embodiment, the IIE module retrieves information for the interactive interface, shown as Step 450. In some embodiments, this step entails the IIE module retrieving the appropriate interface, itself, from storage to be made available to the agent. Similar to the criteria, the appropriate interface may be based on certain information that pertains to the particular agent. For example, the campaign may be set up to use a first interactive interface for the first fifty calls fielded by the agent and a second interactive interface for the calls thereafter. In addition, in particular embodiments, the agent may be provided with two or more interactive interfaces to choose from and the IIE module retrieves the interface selected by the agent. For example, in one embodiment, the interaction criteria may have been met for a first interactive interface and a second interactive interface. As a result, the agent is given a choice of selecting which of the two interfaces that agent would like to interact with and the IIE module receives the selection made by the agent. Accordingly, the IIE module then retrieves the selected interactive interface.

Further, in various embodiments, particular interfaces may be configured to incorporate information into the interface. For example, the interface may involve presenting a trivia game to agents and the interface incorporates the trivia questions into the interface before it is displayed for an agent. Therefore, in these particular instances, the IIE module may query the needed information from various internal and external components with respect to the call center architecture 100. For instance, in particular embodiments, the interactive interface may make use of training information (e.g., may provide a trivia game on training topics) and the IIE module queries the call center's data store 175 for training material. Under such a configuration, the interactive interface may be used to provide training on current and/or updated topics for agents. Furthermore, under such a configuration, the interactive interface may be used to provide training that is specific for particular agents. That is, for example, the IIE module may query training information to present on the interface that has been specifically identified for one or more agents to whom the interface will be made available.

Next, the IIE module provides the interface to the agent, shown as Step 455. For instance, in one embodiment, the IIE module causes the interface to popup on the agent's workstation. In another embodiment, the IIE module provides a button on the agent's workstation or unlocks a button on the workstation so that the agent can select the button and have the interface popup on the agent's workstation. Such a configuration may allow for the agent to go on with his daily tasks, such as field another call if need be, and access the interactive interface at a more convenient time. Those of ordinary skill in the art can envision several ways to provide the agent with the interactive interface in light of this disclosure.

At this point, the agent may interact with the interface. For instance, in various embodiments, the interface provides some type of game for the agent to play that may result in the agent winning an award. For example, the interface may be a game of tic-tac-toe that the agent plays in order to win some type of bonus, such as money or additional break time. As a result, in various embodiments, the agent is able to engage in an activity that is not normally a part of the agent's daily work activities and win an award. Thus, advantages to providing such an interface may include breaking the day-to-day fatigue many agents face and keeping agents motivated to perform work tasks correctly (e.g., promoting agents to perform positive behaviors).

At Step 460, the IIE module determines whether the agent is entitled to an award. That is, returning to the example, the IIE module determines whether the agent has won the tic-tac-toe game. Generally, in various embodiments, the tic-tac-toe game is configured so that the agent plays the game against logic programmed within the interface (e.g., so that the agent plays the game against the machine). In particular embodiments, the logic may be configured to include certain difficulty levels that allow the interface to adjust its play based on the agent's success and/or how often the agent plays the game. Further, in other embodiments, the interface may be configured to allow the agent to play against other opponents, such as, for example, other agents who have qualified to play the game.

If the IIE module determines the agent is entitled to an award, the IIE module displays the award on the agent's workstation, shown as Step 465. For example, if the agent wins the tic-tac-toe game, the interface flashes a screen informing the agent that he is a winner and that he has won $5. At this point, the IIE module records information on the agent's game and award, shown as Step 470. Similar to the other information previously discussed, in various embodiments, the IIE module records the information in a data store 175 located within the call center architecture 100. However, in particular embodiments, the IIE module may record the information in other storage media internal and/or external to the call center architecture 100 instead of or in addition to the data store 175. For example, in one embodiment, the call center operator may use an internal or external service provider for payroll services and the IIE module may record the information on the agent's award to the payroll service provider so that the award is included in the agent's next paycheck. Further, in various embodiments, the IIE module may record any number of different types of information along with the information on the game and the award won by the agent. For example, in particular embodiments, the IE module may also record information on the campaign being conducted at the time the agent played the game and/or information on the call(s) associated with the agent's play of the game.

It should be noted that in some embodiments, the interaction, itself, may serve as the award. For instance, in particular embodiments, the interactive interface may be a video game and the award provided to the agent is a set amount of time the agent is able to play the video game as a result of qualifying to interact with the interface. For example, the agent may be awarded five minutes to play the game as a result of qualifying to interact with the interface. Further, in particular embodiments, the amount of time may adjust for subsequent qualifications to interact with the interface. For example, in one particular embodiment, the amount of time may increase by two minutes each time the agent qualifies to play the game. Those of ordinary skill in the art can envision several different features that may be implemented for such embodiments in light of this disclosure.

Once the agent has finished interacting with the interface, the interface is closed and the agent goes about conducting his daily activities until he qualifies to interactive with the interface again or with another interface. At this point, other components within or outside of the call center architecture 100 may query and use the information recorded on the agent's interaction with interfaces during the campaign. For example, as mentioned, the call center's payroll system or services may query the information on each individual agent to ensure each agent is paid the appropriate award. In addition, the IE module may query the information to determine what interfaces and/or criteria are appropriate for a particular call handled by the agent. Further, one or more components may query the information for reporting purposes. Those of ordinary skill in the art can envision several uses for the information in light of this disclosure.

Reporting Module

In various embodiments, reporting functionality may be provided to report information on agents, awards, interfaces, and/or interface interactions that occurred during one or more campaigns. Typically, such functionality is provided through an interface that is accessible by individuals, such as agents, call center administrators, and/or agent supervisors, who request one or more reports. However, in particular embodiments, the functionality may also involve sending reporting information directly to one or more components that are internal or external to the call center architecture 100. Such information may be sent automatically at defined intervals (e.g., at the end of each campaign) and/or at the request of the components.

Figure 5:
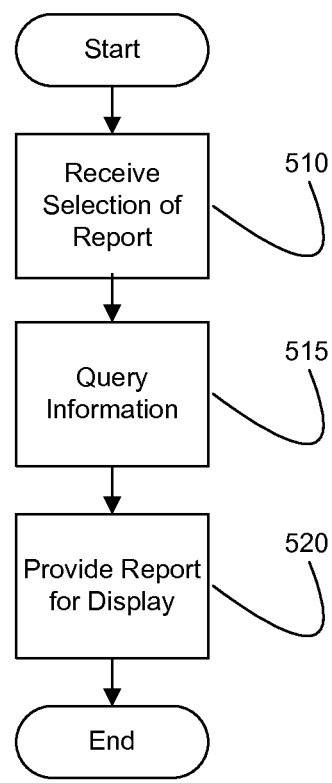
FIG. 5 is a flowchart illustrating a reporting module that can be used in accordance with various embodiments of the present invention.

Turning now to FIG. 5, additional details will be provided regarding the process flow for providing reporting functionality on one or more agents, awards, interactive interfaces, particular interactions, and/or campaigns. Specifically, FIG. 5 is a flow diagram showing a reporting module for providing reporting functionality according to one embodiment of the invention. Accordingly, the flow diagram shown in FIG. 5 may correspond to steps carried out by a processor in a computing device, such as the CTI server 145, as it executes the reporting module stored in the computing device's volatile and/or nonvolatile memory.

The process starts out with the reporting module receiving a selection of a particular report, shown as Step 510. For instance, in various embodiments, a user accesses a menu of available reports by opening a screen provided by an interface on the user's workstation and the screen provides a listing of the available reports from which the user selects the particular report of interest. As mentioned, depending on the embodiment, reports may provided for a wide range of information associated with the interactive interfaces, the agents who interacted with the interfaces, and the interactions that occurred during one or more campaigns.

In Step 515, the reporting module queries the appropriate information for the selected report. As previously described, in various embodiments, information is stored within and/or outside of the call center architecture 100 on the use of the various interactive interfaces during campaigns and the agents who engaged in such use. For example, in particular embodiments, information is stored in one or more databases residing on a data store 175 within the call center architecture 100. The reporting module queries this stored information to obtain the appropriate information for the selected report. As one of ordinary skill in the art will appreciate, the reporting module may need to query more than one data source for any particular report.

Finally, in Step 520, the reporting module provides the report to the user's workstation for display. At this point, the user may review the information provided on the particular report. In particular embodiments, the reporting module also includes the capabilities to print the report if desired by the user. Further, in particular embodiments, the reporting module also includes the capabilities to send the report information to a component inside or outside of the call center architecture 100. For example, the reporting module may have capabilities to send information on issued awards to an accounting system so that the agents are properly paid for the awards the agents have earned. Such capabilities may be provided by the reporting module automatically sending such information at a designated time (e.g., once a week) or by the component requesting the information.

Examples of Interactive Interfaces and Reports

Figure 6:
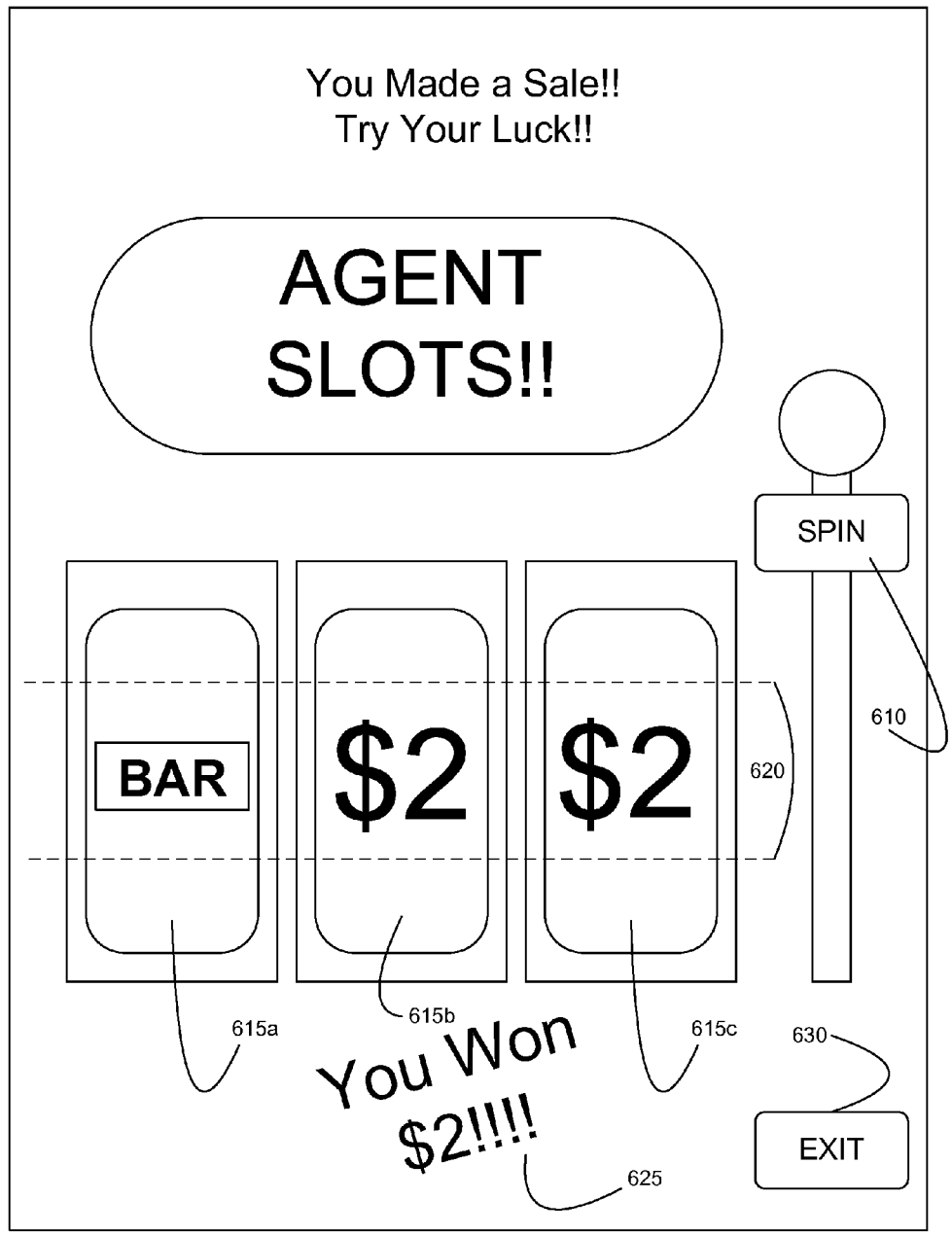
FIG. 6 is a screen display of an interactive interface in accordance with various embodiments of the present invention.
Figure 7:
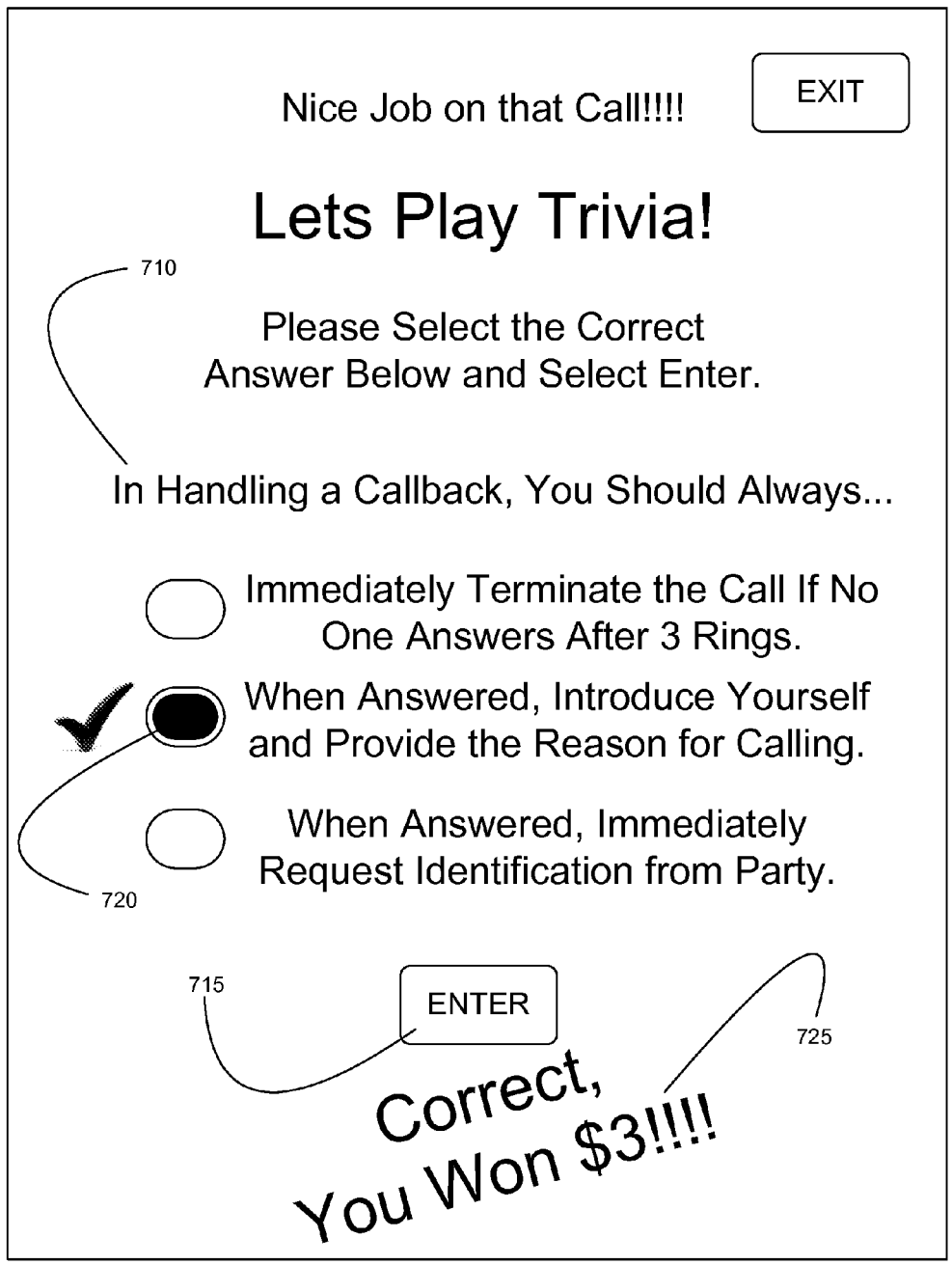
FIG. 7 is a screen display of a second interactive interface in accordance with various embodiments of the present invention.

FIGS. 6 and 7 provide examples of two different interactive interfaces according to various embodiments of the invention. FIG. 6 specifically provides an example of an interactive interface involving a game of chance. That is, more specifically, FIG. 6 provides an interactive interface that is a slot machine. For this particular example, the agent is able to spin the slot machine and win money.

Turning to FIG. 6, once the interface appears on the agent's workstation, the agent is able to spin the slot machine by selecting the "SPIN" button 610. The agent selects the "SPIN" button and the machine spins the three reels 615a-615c until the reels 615a-615c stop with a symbol for each reel 615a-615c appearing on the payline 620. The slot machine is considered a game of chance because the game is configured so that the symbols that appear on the payline 620 do so in a random fashion. For this particular example, the reels 615a-615c have stopped showing a payline 620 having a "BAR" symbol and two "$" symbols and the interface informs the agent that he has won two dollars 625. At this point, the agent can exit the interface by selecting the "EXIT" button 630. In turn, the agent's award of two dollars is recorded.

Turning now to the example of an interactive interface shown in FIG. 7, this particular interface involves the agent interacting with the interface by playing a trivia game. For this particular example, the agent is asked to select the correct answer to the trivia question 710 and to press the "ENTER" button 715. Therefore, the agent reads the three choices for answers to the question, clicks on the button 720 that corresponds to the correct answer, and presses the "ENTER" button 715. As a result, the interface informs the agent that he has answered the trivia question correctly and has won three dollars 725.

A further component of the interactive interface shown in FIG. 7 is that the interface serves a second function besides providing motivation and incentives to agents to engage in desired behavior. In this instance, the interactive interface is also being used to train agents. The trivia question 710 being asked is directed to information that is important for an agent to know in performing his work activities. Specifically, the question is directed to what the agent should do when handling a callback. In the example, if the agent had instead answered the question incorrectly, the interface would have informed the agent that he is incorrect and would have pointed out the correct answer 810, as shown in FIG. 8. Therefore, in various embodiments, the interactive interface may also serve as a training tool.

Figure 9:
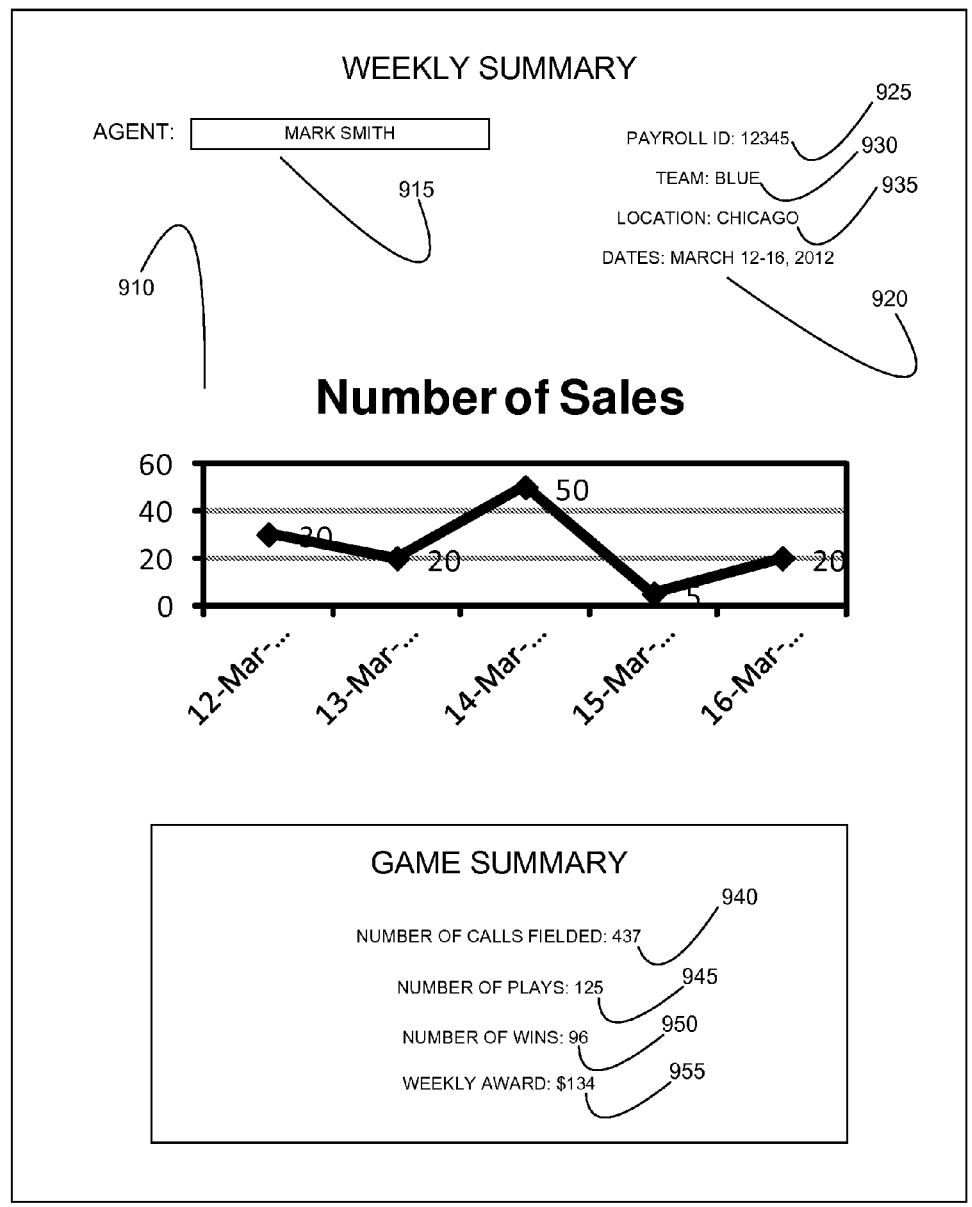
FIG. 9 is a screen display of an agent report in accordance with various embodiments of the present invention.

FIG. 9 provides an example of a report on a specific agent and the agent's activities involving interactive interfaces. Such a report may be provided to a call center administrator, supervisor, and/or manager. In this particular example, the report provides a graph 910 on the number of sales made by agent Mark Smith 915 during Mar. 12, 2012 to Mar. 16, 2012 920. The report also provides general information about the agent, such as his payroll ID 925, team 930, and location 935. Further, the report provides information on the agent's interaction with an interface (s) (e.g., the agent's playing of a game(s) provided via the interface(s)). Specifically, the report informs the reader that the agent fielded 437 calls 940 during the time period of Mar. 12, 2012 to Mar. 16, 2012 920. During that time, the agent played the game(s) provided by the interactive interface(s) a total of 125 times 945 and the won 96 times 950. Finally, the report indicates that the agent won a total of $134 955 based on his 96 wins 950. As one of ordinary skill in the art can envision in light of this disclosure, the report may be configured in any number of ways and provide any desired additional information, such as the criteria that was used during the time period. Further, depending on the embodiment, reports may be included that display other types of information, such as, for example, a summary report for all agents during the time period or a report listing a summary on all of the games played during the time period.

Exemplary Server Component

Figure 10:
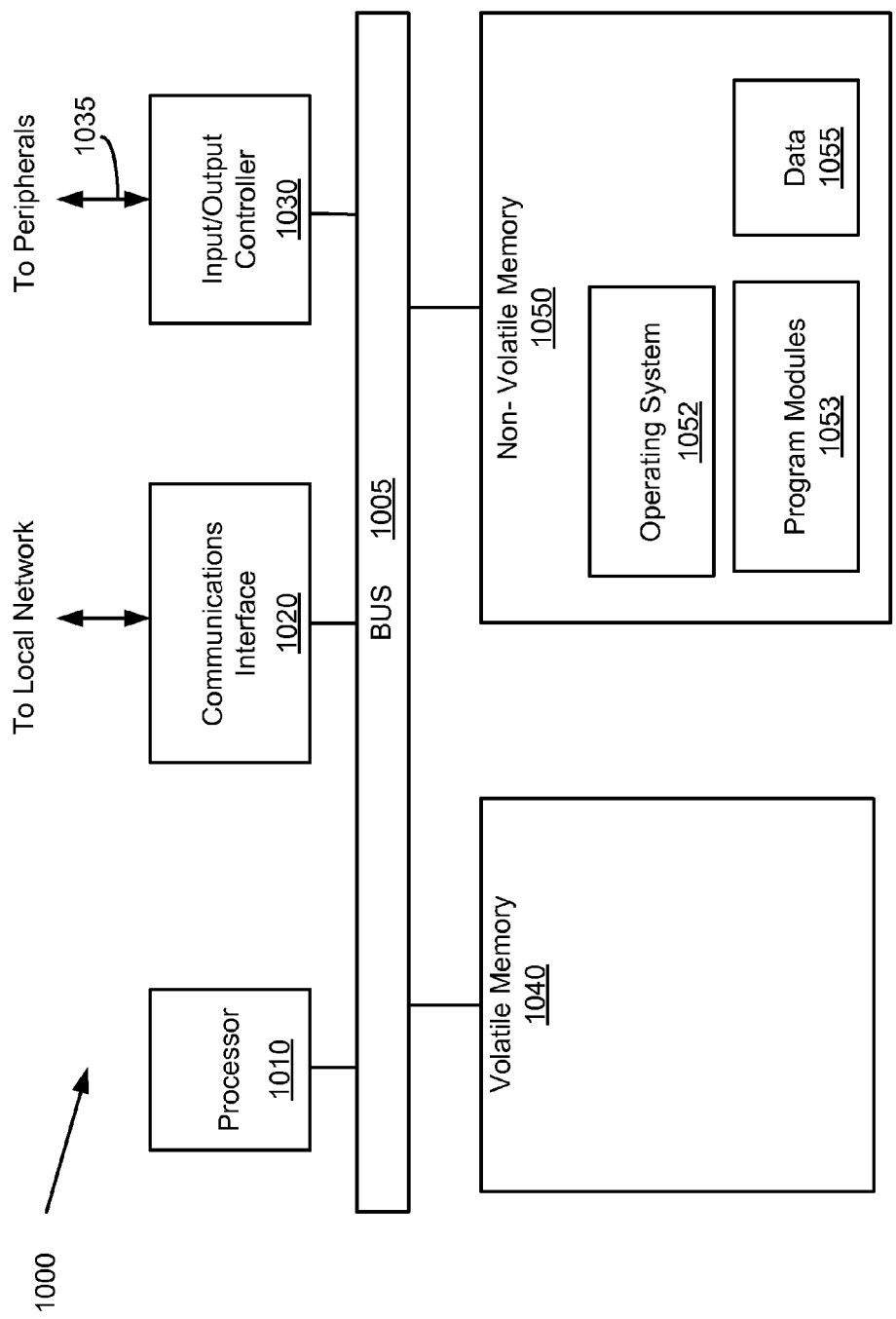
FIG. 10 is an exemplary schematic diagram of a server used in one embodiment of the call center architecture to practice the technologies disclosed herein.

As discussed in conjunction with FIG. 1, the call center architecture 100 may comprise various components, such as servers, that comprise a processing system. FIG. 10 is an exemplary schematic diagram of a server that may be used in an embodiment of the call center architecture 100 to practice the technologies disclosed herein. FIG. 10 provides an exemplary schematic of a processing system 1000, which could represent individually or in combination, for example, the ACD 130, IVR 135, CRM server 140, CTI server 145, PD 150, WFM server 155, agent computer 160a, or other components previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 10, the processing system 1000 may include one or more processors 1010 that may communicate with other elements within the processing system 1000 via a bus 1005. The processor 1010 may be implemented as one or more complex programmable logic devices ("CPLDs"), microprocessors, multi-core processors, digital signal processors ("DSPs"), system-on-a-chip ("SOCs"), co-processing entities, application-specific integrated circuits ("ASICs"), field programmable gate arrays ("FPGAs"), programmable logic arrays ("PLAs"), hardware accelerators, other circuitry, or the like.

In one embodiment, the processing system 1000 may also include one or more communications interfaces 1020 for communicating data via the local network 170 with various external devices, such as other servers of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1030 may also communicate with one or more input devices or peripherals using an interface 1035, such as, but not limited to: a keyboard, a mouse, a touch screen/display input, microphone, pointing device, etc. The input/output controller 1030 may also communicate with output devices or peripherals, such as displays, printers, speakers, headsets, banner displays, etc.

The processor 1010 may be configured to execute instructions stored in volatile memory 1040, non-volatile memory 1050, or other forms of computer-readable storage media accessible to the processor 1010. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1050 may store program code and data, which also may be loaded into the volatile memory 1040 at execution time. Specifically, the non-volatile memory 1050 may store one or more program modules 1053 and/or operating system code 1052 containing instructions for performing the process and/or functions associated with the technologies disclosed herein. For example, the program modules 1053 may comprises one or more of the ID module, the II module, the IIE module, and/or reporting module previously discussed. The program modules 1053 may also access, generate, or store data 1055 in the non-volatile memory 1050, as well as in the volatile memory 1040. Further, the program modules may be implemented as one module or as other groupings. For example, in particular embodiments, the Id module and the II module may be combined and implemented as a single module.

The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, the processor 1010. These may form a part of, or may interact with, the program modules 1053.

The technologies described herein may be implemented in various ways, including as computer program products comprising memory storing instructions causing a processor to perform the operations associated with the above technologies. The computer program products may comprise a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer-readable storage media include all the above identified computer-readable media (including volatile and non-volatile media), but does not include a transitory, propagating signal. Non-volatile computer-readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

Conclusion

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for providing an interactive interface to a particular agent from a plurality of call center agents of a call center, the method comprising the steps of:

defining first display criteria for providing the interactive interface on any one of a plurality of computer workstations used by the plurality of call center agents, the first display criteria comprising a first set of one or more outcomes to a telephone call fielded by any one of the plurality of call center agents, a first particular outcome from the first set of one or more outcomes for a first particular occurrence of any one of the plurality of call center agents fielding a telephone call, and a second particular outcome from the first set of one or more outcomes for a second particular occurrence of any one of the plurality of call center agents fielding a telephone call;

defining second display criteria for providing the interactive interface on any one of the plurality of computer workstations used by the plurality of call center agents, the second display criteria comprising a second set of one or more outcomes to a telephone call fielded by any one of the plurality of call center agents, a first particular outcome from the second set of one or more outcomes for a first particular occurrence of any one of the plurality of call center agents fielding a telephone call, and a second particular outcome from the second set of one or more outcomes for a second particular occurrence of any one of the plurality of call center agents fielding a telephone call;

scheduling a time period for making the interactive interface potentially available to the plurality of call center agents; and during the time period:
    applying the first display criteria or the second display criteria based on a history the particular agent has with respect to interacting with the interactive interface;
    upon applying the first display criteria, providing the interactive interface on a computer workstation used by the particular agent in response to an outcome to a telephone call fielded by the particular agent for the first particular occurrence meeting the first particular outcome from the first set of one or more outcomes defined by the first display criteria or the outcome to the telephone call fielded by the particular agent for the second particular occurrence meeting the second particular outcome from the first set of one or more outcomes defined by the first display criteria;
    upon applying the second display criteria, providing the interactive interface on the computer workstation used by the particular agent in response to the outcome to the telephone call fielded by the particular agent for the first particular occurrence meeting the first particular outcome from the second set of one or more outcomes defined by the second display criteria or the outcome of the telephone call fielded by the particular agent for the second particular occurrence meeting the second particular outcome from the second set of one or more outcomes defined by the second display criteria; and
    upon providing the interactive interface on the computer workstation used by the particular agent:
        awarding the particular agent, by at least one computer processor, with an award based on an interaction with the interactive interface performed by the particular agent;
        tracking, by the at least one computer processor, awarding of the award to the particular agent; and
        reporting, by the at least one computer processor, awarding of the award to the particular agent.

2. The method of claim 1, wherein the award comprises a first award and a second award, and the step of awarding the particular agent with the award comprises:
    awarding the particular agent, by the at least one computer processor, with the first award or the second award based on the interaction with the interactive interface performed by the particular agent.

3. The method of claim 1 further comprising the steps of defining agent criteria for identifying the plurality of call center agents and identifying the plurality of call center agents based on the agent criteria.

4. The method of claim 1, wherein the interactive interface comprises a game selected from one of a roulette wheel, a slot machine, dice, and cards, and the interaction comprises playing the game.

5. The method of claim 1, wherein the first and second sets of one or more outcomes comprise one or more of:
    the call being answered;
    a callback being requested;
    an appointment being setup;
    a sale occurring;
    a number of sales reaching a predefined number;
    a monetary value of a sale equaling at least a predefined amount; and
    a number of items for a sale being at least a predefined number.

6. A non-transitory computer-readable storage medium comprising computer-executable instructions for providing an interactive interface to a particular agent from a plurality of call center agents of a call center, the computer-executable instructions being configured, when executed by at least one computer processor, to:
    record first display criteria for providing the interactive interface on any one of a plurality of computer workstations used by the plurality of call center agents, the first display criteria comprising a first set of one or more outcomes to a telephone call fielded by one of the plurality of call center agents, a first particular outcome from the first set of one or more outcomes for a first particular occurrence of any one of the plurality of call center agents fielding a telephone call, and a second particular outcome from the first set of one or more outcomes for a second particular occurrence of any one of the plurality of call center agents fielding a telephone call;
    record second display criteria for providing the interactive interface on any one of the plurality of computer workstations used by the plurality of call center agents, the second display criteria comprising a second set of one or more outcomes to a telephone call fielded by any one of the plurality of call center agents, a first particular outcome from the second set of one or more outcomes for a first particular occurrence of any one of the plurality of call center agents fielding a telephone call, and a second particular outcome from the second set of one or more outcomes for a second particular occurrence of any one of the plurality of call center agents fielding a telephone call;
    schedule a time period for making the interactive interface potentially available to the plurality of call center agents; and
    during the time period:
        apply the first display criteria or the second display criteria based on a history the particular agent has with respect to interacting with the interactive interface;
        upon applying the first display criteria, provide the interactive interface on a computer workstation used by the particular agent in response to an outcome to a telephone call fielded by the particular agent for the first particular occurrence meeting the first particular outcome from the first set of one or more outcomes defined by the first display criteria or the outcome to the telephone call fielded by the particular agent for the second particular occurrence meeting the second particular outcome from the first set of one or more outcomes defined by the first display criteria;
        upon applying the second display criteria, provide the interactive interface on the computer workstation used by the particular agent in response to the outcome to the telephone call fielded by the particular agent for the first particular occurrence meeting the first particular outcome from the second set of one or more outcomes defined by the second display criteria or the outcome of the telephone call fielded by the particular agent for the second particular occurrence meeting the second particular outcome from the second set of one or more outcomes defined by the second display criteria; and
        upon providing the interactive interface on the computer workstation used by the particular agent:
            award the particular agent with an award based on an interaction with the interactive interface performed by the particular agent;
            track awarding of the award to the particular agent; and
            report awarding of the award to the particular agent.

7. The non-transitory computer-readable storage medium of claim 6, wherein the award comprises a first award and a second award, and the computer-executable instructions are further configured, when executed by the at least one computer processor, to:

award the particular agent with the first award or the second award based on the interaction with the interactive interface performed by the particular agent.

8. The non-transitory computer-readable storage medium of claim 6, wherein the computer-executable instructions are further configured, when executed by the at least one computer processor, to record agent criteria for identifying the plurality of call center agents and identify the plurality of call center agents based on the agent criteria.

9. The non-transitory computer-readable storage medium of claim 6, wherein the interactive interface comprises a game selected from one of a roulette wheel, a slot machine, dice, and cards, and the interaction comprises playing the game.

10. The non-transitory computer-readable storage medium of claim 6, wherein the first and second sets of one or more outcomes comprise one or more of:

the call being answered;

a callback being requested;

an appointment being setup;

a sale occurring;

a number of sales reaching a predefined number;

a monetary value of a sale equaling at least a predefined amount; and a number of items for a sale being at least a predefined number.

11. A system for providing an interactive interface to a particular agent from a plurality of call center agents of a call center, the system comprising one or more computer processors configured to:

record first display criteria for providing the interactive interface on any one of a plurality of computer workstations used by the plurality of call center agents, the first display criteria comprising a first set of one or more outcomes to a telephone call fielded by any one of the plurality of call center agents, a first particular outcome from the first set of one or more outcomes for a first particular occurrence of any one of the plurality of call center agents fielding a telephone call, and a second particular outcome from the first set of one or more outcomes for a second particular occurrence of any one of the plurality of call center agents fielding a telephone call;

record second display criteria for providing the interactive interface on any one of the plurality of computer workstations used by the plurality of call center agents, the second display criteria comprising a second set of one or more outcomes to a telephone call fielded by any one of the plurality of call center agents, a first particular outcome from the second set of one or more outcomes for a first particular occurrence of any one of the plurality of call center agents fielding a telephone call, and a second particular outcome from the second set of one or more outcomes for a second particular occurrence of any one of the plurality of call center agents fielding a telephone call;

schedule a time period for making the interactive interface potentially available to the plurality of call center agents; and during the time period:

apply the first display criteria or the second display criteria based on a history the particular agent has with respect to interacting with the interactive interface;

upon applying the first display criteria, provide the interactive interface on a computer workstation used by the particular agent in response to an outcome to a telephone call fielded by the particular agent for the first particular occurrence meeting the first particular outcome from the first set of one or more outcomes defined by the first display criteria or the outcome to the telephone call fielded by the particular agent for the second particular occurrence meeting the second particular outcome from the first set of one or more outcomes defined by the first display criteria;

upon applying the second display criteria, provide the interactive interface on the computer workstation used by the particular agent in response to the outcome to the telephone call fielded by the particular agent for the first particular occurrence meeting the first particular outcome from the second set of one or more outcomes defined by the second display criteria or the outcome of the telephone call fielded by the particular agent for the second particular occurrence meeting the second particular outcome from the second set of one or more outcomes defined by the second display criteria; and upon providing the interactive interface on the computer workstation used by the particular agent:

award the particular agent with an award based on an interaction with the interactive interface performed by the particular agent;

track awarding of the award to the particular agent; and report awarding of the award to the particular agent.

12. The system of claim 11, wherein the award comprises a first award and a second award, and the one or more computer processors are further configured to:

award the particular agent with the first award or the second award based on the interaction with the interactive interface performed by the particular agent.

13. The system of claim 11, wherein the interactive interface comprises a game selected from one of a roulette wheel, a slot machine, dice, and cards, and the interaction comprises playing the game.

14. The system of claim 11, wherein the first and second sets of one or more outcomes comprise one or more of:

the call being answered;

a callback being requested;

an appointment being setup;

a sale occurring;

a number of sales reaching a predefined number;

a monetary value of a sale equaling at least a predefined amount; and a number of items for a sale being at least a predefined number.

15. The method of claim 1, wherein the step of applying the first display criteria or the second display criteria is also based on a history of outcomes the particular agent has with respect to fielding calls.

16. The tangible computer-readable storage medium of claim 6, wherein the computer-executable instructions are further configured, when executed by the at least one computer processor, to apply the first display criteria or the second display criteria also based on a history of outcomes the particular agent has with respect to fielding calls.

17. The system of claim 11, wherein the one or more computer processors are further configured to apply the first display criteria or the second display criteria also based on a history of outcomes the particular agent has with respect to fielding calls.

* * * * *